June 13, 1939.   F. H. MILLIKEN   2,161,929
SLIP FREQUENCY RELAY
Original Filed Nov. 15, 1934   3 Sheets-Sheet 1

Inventor
FRANK H. MILLIKEN
By Semmes & Semmes
Attorneys

June 13, 1939.  F. H. MILLIKEN  2,161,929
SLIP FREQUENCY RELAY
Original Filed Nov. 15, 1934  3 Sheets-Sheet 2
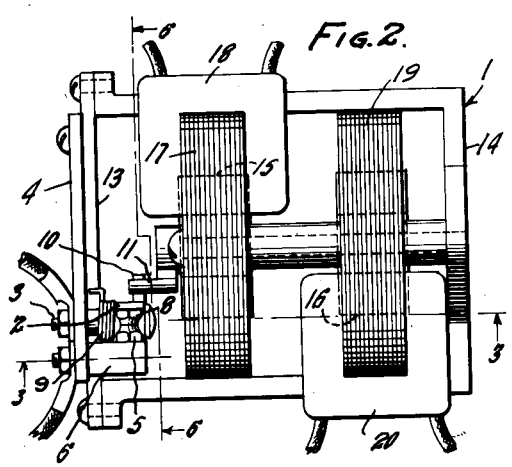
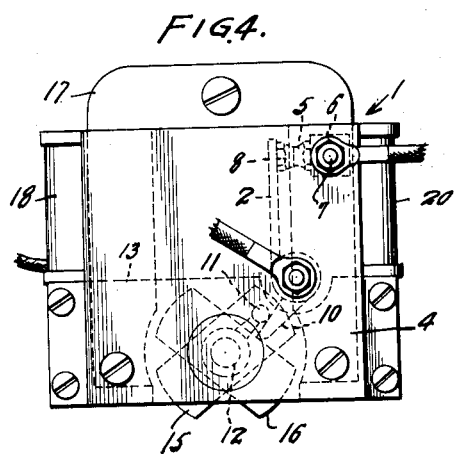
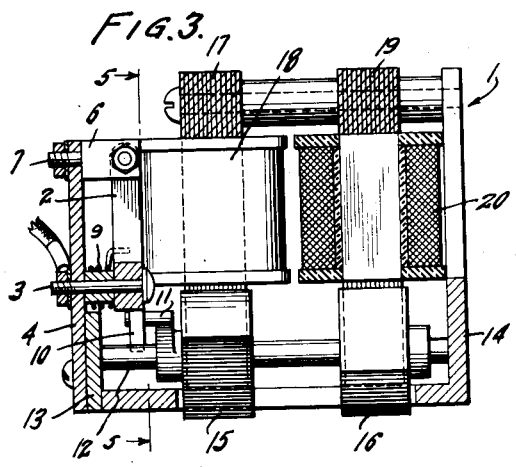
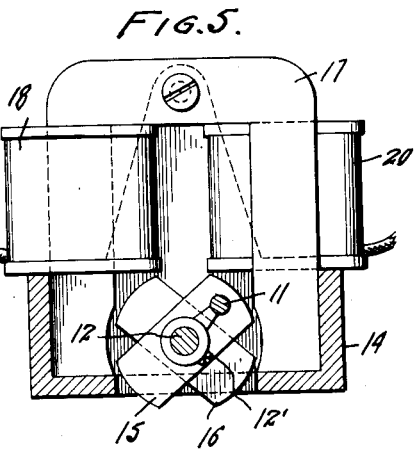
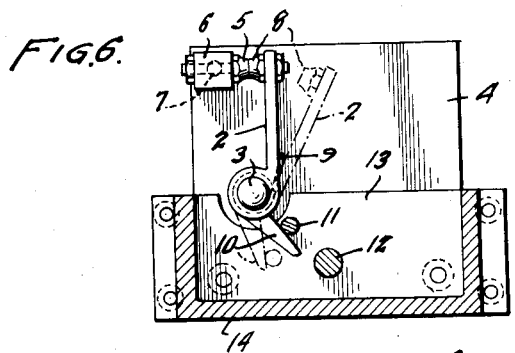
Inventor
FRANK H. MILLIKEN
By Semmes & Semmes
Attorneys

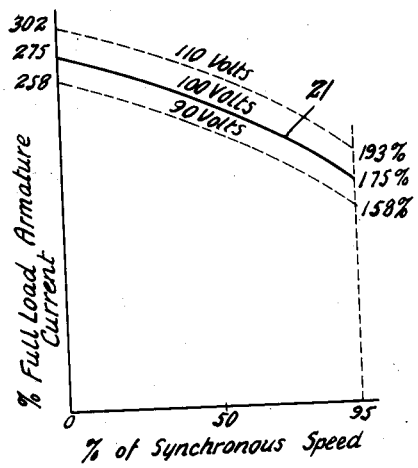
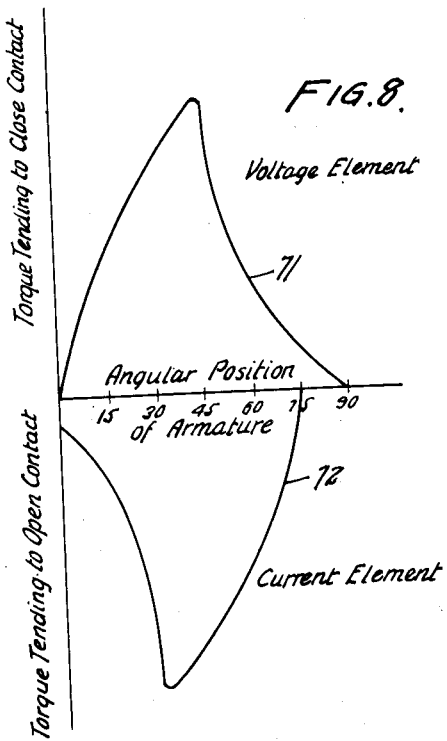
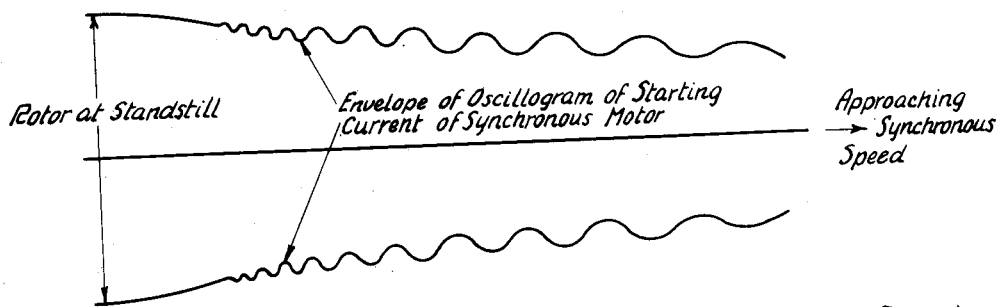

Patented June 13, 1939

2,161,929

UNITED STATES PATENT OFFICE 2,161,929

SLIP FREQUENCY RELAY

Frank H. Milliken, Mansfield, Ohio, assignor to The Ideal Electric and Manufacturing Company, Mansfield, Ohio, a corporation of Ohio Original application November 15, 1934, Serial No. 753,213, now Patent No. 2,104,664, dated January 4, 1938. Divided and this application April 1, 1935, Serial No. 14,155

7 Claims. (Cl. 200—98)

This application is a division of my co-pending application Serial No. 753,213, filed November 15, 1934 which became Patent No. 2,104,664 on January 4, 1938.

My invention relates to a sensitive and positive acting relay which is for use in many applications in the electrical art. I have shown the relay as applied to the control of circuits for a synchronous motor, but it is to be understood that the relay has other varied uses.

One of the objects of my invention is to provide a relay which will be very positive in action and which upon the occurrence of certain conditions in a circuit will quickly move to make or break the circuit.

A further object of my invention is to provide a relay whose natural period of vibration is effected by the pulsation in one of the controlling coils, whereby such pulsations are used to effect opening or closing of contacts.

Still another object of this invention is to provide a relay for controlling the opening and closing of the direct current excitation circuit of a synchronous motor, the operation of the relay depending on the speed of the synchronous motor.

Yet another object of this invention is to provide a relay for controlling the direct current excitation circuit of a synchronous motor, said relay having a closing coil excited in proportion to the potential applied to the motor and an opening coil excited by the current flowing through the armature of the motor, said relay also having a natural oscillating frequency corresponding to the armature current pulsations as the motor attains a speed at which the direct current excitation is to be effected.

A still further object of this invention is to provide a relay for controlling the direct current excitation of a synchronous motor which is responsive to the slip frequency when the motor has reached the speed at which the direct current excitation is to be applied to complete the direct current excitation circuit.

With these and other important objects in view, which may be incident to my improvements, the invention resides in the parts and combinations to be hereinafter set forth and claimed, with the understanding that the several necessary elements comprising my invention may be varied in construction, proportions and arrangement, without departing from the spirit and scope of the appended claims.

In accordance with the present invention, a relay is provided having a contactor for controlling the direct current excitation of a synchronous motor. The contactor is opened and closed by a shaft having two armatures thereon. One of the armatures is drawn into a magnetic field created by the flow through a coil of current proportional to current flowing through the armature of the motor, and the other armature is drawn to a magnetic field created by the flow through a coil of current proportional to the voltage applied to the motor. The magnetic field created by the armature current tends to open the contactor, and the magnetic field created by current proportional to the voltage applied to the motor tends to close the contactor. When the main switch of the motor is actuated to start the motor both of the relay coils are energized, but as the armature current is high the magnetic field affecting the armature for opening the contactor is greatest and the contactor is held in open position. As the speed of the motor increases, the frequency of the pulsations of the armature current decreases and the current decreases. The relay is constructed to have a natural frequency corresponding to the frequency of pulsation of the armature current at a rotor speed at which the field excitation should be applied. Consequently when the armature current reaches this frequency the relay tends to vibrate and as the voltage controlled field then predominates the contactor is closed to complete the excitation circuit.

In order to make my invention more clearly understood, I have shown in the accompanying drawings means for carrying the same into practical effect without limiting the improvements in their useful applications to the particular constructions which, for the purposes of explanation, have been made the subject of illustration.

In the drawings:

Fig. 2 is a plan view of a slip frequency relay constructed in accordance with the present invention;

Fig. 3 is a sectional view taken on line 3—3 of Fig. 2;

Fig. 4 is an end view of the device shown in Fig. 2;

Fig. 5 is a sectional view taken on line 5—5 of Fig. 3;

Fig. 6 is another sectional view taken on line 6—6 of Fig. 2;

Fig. 7 is a chart showing the variation in armature current relative to the speed of the synchronous motor;

Fig. 8 is another chart showing diagrammatically the torque developed in the relay armatures;

Fig. 9 is an oscillograph diagram showing the change in frequency of the pulsations of the current flowing through the armature as the rotor speed increases.

Figure 1:
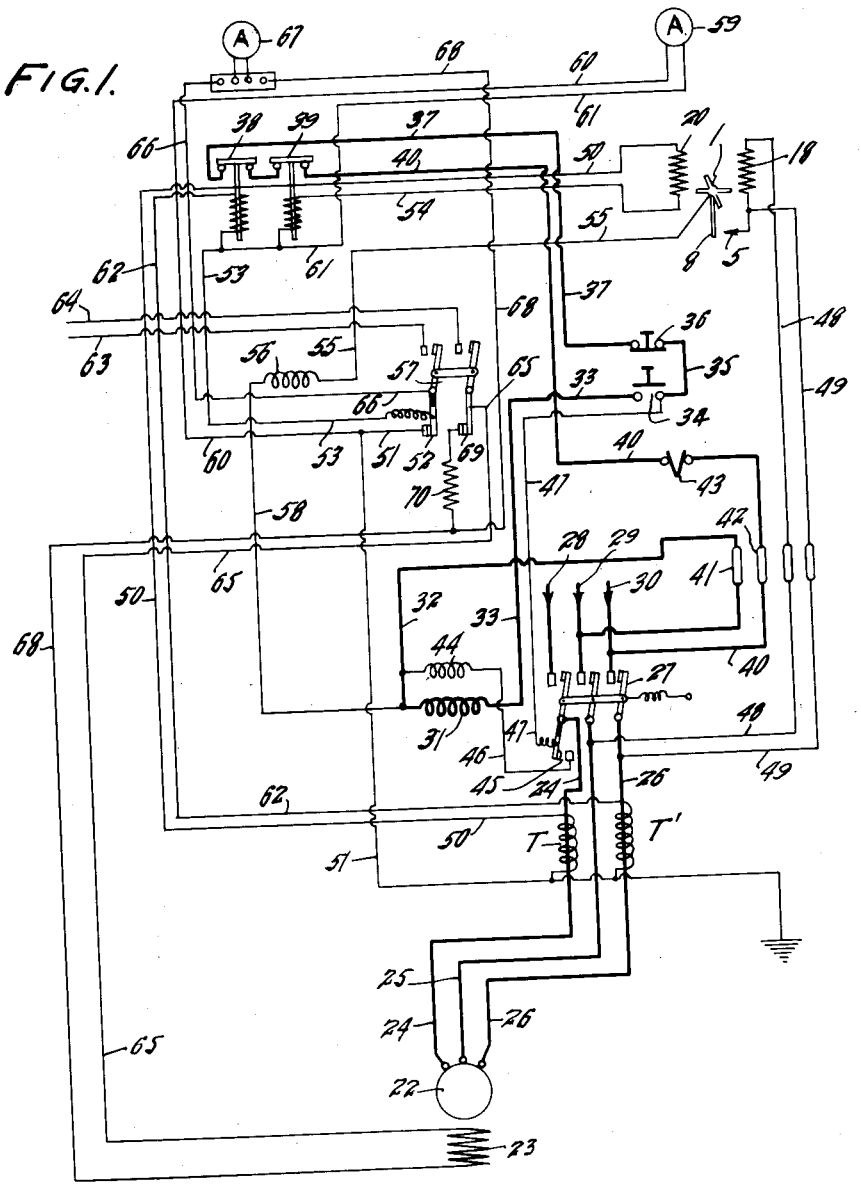
Figure 1 is a schematic view of a circuit embodying the relay of the present invention.

In order to eliminate the manual control of the direct current excitation of the synchronous motor, the present invention provides a relay 1 as shown in Figs. 1 to 6 of the drawings for making and breaking a relay circuit which in turn controls the excitation circuit. The relay embodies a contactor arm 2 pivotally mounted on a pin 3 supported by a panel 4. A stationary contact member 5 is carried by a support 6 which is secured to insulating panel 4 by a bolt 7 which also serves as a binding post for a conductor.

A contact point 8 is carried on the free end of arm 2 and cooperates with contact member 5. Arm 2 is provided with a spring 9 which tends to urge the arm to a position to bring contacts 5 and 8 together.

A lug or arm 10 is carried by the contact arm 2 by means of which the contact arm 2 is moved to break contact between the contactors 5 and 8. Cooperating with lug 10 is a finger 11 carried by a shaft 12. As clearly shown in the drawings, shaft 12 is rockably mounted in bearings provided in the end walls 13 and 14 of the frame or casing of the relay. Affixed to shaft 12 are a pair of armatures 15 and 16, which are shown arranged at an angle of substantially 75°. Since the armatures 15 and 16 are affixed to shaft 12 by set screws 12' their angular position may be adjusted to obtain the best results with the conditions encountered.

Armature 15 has an inverted U-shaped magnetic core 17 associated therewith, the poles of the core being positioned to act on the armature 15. When a magnetic field is set up in core 17 the magnetic lines of force passing from one pole to the other through the air gap act on the armature 15 and tend to move it to a position in alignment with the poles of core 17. When such action takes place the shaft 12 as shown in Figs. 4 and 5 would be rotated clockwise (counterclockwise in Fig. 6) and would by means of finger 11 and lug 10 move contact arm 2 to break the electrical connection between contacts 5 and 8. For setting up a magnetic field in core 17 a coil or winding 18 is provided.

Core 19 and coil 20, similar to core 17 and coil 18, respectively, are associated with armature 16. When a magnetic flux is set up in core 19 by excitation of winding 20 there is a torque created which tends to rotate shaft 12 as shown in Figs. 4 and 5 and counterclockwise (clockwise in Fig. 6) thereby moving finger 11 away from lug 10 and permitting spring 9 to act on arm 2 to close contacts 5 and 8.

Now it will be reaized that if both coils 18 and 20 are simultaneously excited there will be opposing torques acting to rotate shaft 12 in opposite directions and that the coil which is most highly excited will predominate and will effect rotation of the shaft against the opposing torque created by the other coil.

Both cores are secured to the frame of the relay by suitable securing means in proper position so as to accurately control the position of shaft 12 and the contact arm 2.

Synchronous motors are started as induction motors and when the rotor has accelerated to a speed approximating synchronous speed the field is excited by direct current. In some instances synchronous motors are first supplied with alternating current at a reduced voltage and after a determined rotor speed is obtained it is supplied with alternating current at full voltage and when synchronous speed is approached, direct current excitation is applied. In order to simplify the explanation of the present invention, starting with full voltage alternating current will be presumed, but it shoud be understood that recognized variations of the voltage of the alternating current supplied to the motor in starting may be resorted to in conjunction with the herein described direct current excitation control.

Proceeding with the assumption of full voltage starting, it is known that the current flowing through the armature of the synchronous motor varies from a value well in excess of full load current when the rotor is stationary to full load current at synchronous speed. In Fig. 7 is the drawings, curve 21 illustrates the variation in armature current from rotor speeds varying from zero to 95 per cent of synchronous speed upon applying current to the motor at 100 volts. It will be noted that at constant impressed voltage the current is determined by speed of the motor, also the current at 95% speed which is the speed at which field excitation is usually applied, the current is approximately 60% of the current at standstill.

In addition to the variation in armature current there is also a variation in the frequency of the pulsations of the armature current as speed of the rotor varies. I have shown in Fig. 9 an oscillograph diagram showing the change in pulsation frequency of the armature current as the rotor speed varies from zero to synchronous speed. The frequency of the pulsations is proportional to the slip and thus depends on the rotor speed.

Another characteristic of synchronous motors running without field excitation which must be taken into account by a control relay is shown by the dotted curves of Fig. 7. The current drawn by the motor at any speed is directly proportional to the voltage applied. The torque output of the motor is affected by the voltage applied and thus the accelerating time is affected.

Now the relay described hereinbefore utilizes both the variation in armature current and the variation in the frequency of the pulsations of the armature current for controlling the direct current excitation of a synchronous motor. To utilize these characteristics, coil 18 is connected across the line supplying current to the motor and the field created thereby varies only upon a variation in the voltage of the line. On the other hand, coil 20 is connected so that current flowing therethrough is proportional to the current flowing through the armature of the synchronous motor which varies during the starting period. Furthermore, the relay is so constructed as to have a natural frequency equal to the frequency of the pulsations of the armature current when the rotor is running at a speed at which the direct current excitation is applied so the equilibrium of the relay will be disturbed upon the armature current pulsation attaining that frequency.

In order to more fully describe the function of my relay, I will refer to Fig. 1 of the drawings which shows the relay connected in a starting system for synchronous motors. A synchronous motor having an armature 22 and a direct current excited field 23 is shown with conductors 24, 25 and 26 connected to one set of terminals of a main switch 27. The other set of terminals of main switch 27 is connected to supply line conductors 28, 29 and 30. Since one of the features of the present invention is the avoidance of manual control, means are provided for actuating main switch 27. A closing coil 31 is provided for closing main switch against the action of an opening spring and one end of this coil is connected directly to main line conductor 29 by a lead 32. The other end of coil 31 is connected by wire 33 to one terminal of a starting button 34. A wire 35 connects the other terminal of the starting button with one terminal of a stopping button 36. Starting button 34 is normally held in an open circuit position and stopping button 36 is normally held in a closed circuit position. The other terminal of stopping button 36 is connected by conductor 37 with a pair of serially connected overload relays 38 and 39, which are connected by a wire 40 with main line conductor 30. Fuse 41 form a part of conductor 32 and fuse 42 and safety plug 43 form a part of conductor 40.

With coil 31 connected as described it will be energized upon operation of starting button 34 to close the circuit. Upon exciting coil 31 its core or armature (not shown) will be shifted and main switch 27 will be closed against the action of a conventional spring. A conventional latch mechanism should be associated with the main switch to retain it in closed position and the latch mechanism is actuated by a latching coil 44.

As shown diagrammatically in Fig. 1, closing of main switch 27 also effects closing of an auxiliary switch 45 which is utilized to complete a circuit through latching coil 44. One end of coil 44 is connected by wire 32 with main line conductor 29 and the other end of this coil is connected by wire 46 with one terminal of switch 45. The other terminal of switch 45 is connected by wire 47 to wire 35 which is serially connected by stop button 36, wire 37, overload relays 38, 39 and conductor 40 with main line conductor 30. With these connections it will be realized that upon closing of main switch 27, coil 44 will be energized to latch the main switch in closed position. When the main switch is to be opened push button 36 is actuated to break the circuit through coil 44 which releases the latch and permits the spring to open the main switch.

Upon closing the main switch 27, current is supplied to conductors 24, 25 and 26 and the armature 22 is energized. At this time coil 18 of the relay 1 being connected by wires 48 and 49 with conductors 25 and 26, respectively, is energized and a torque is created tending to rotate shaft 12 to effect closing of contacts 5 and 8. Simultaneously, however, coil 20 is energized which prevents the closing of contacts 5 and 8. One terminal of coil 20 is connected directly by wire 50 with a terminal of the secondary of transformer T the primary of which is excited by the current flowing through conductor 24. The other terminal of the secondary of transformer T is connected by wire 51 to the terminal of a switch 52 which is closed until the synchronous motor approaches synchronous speed. A wire 53 connects switch 52 to one terminal of each of the coils of overload relays 38 and 39. The other terminal of the coil of overload relay 39 is connected by lead 54 with coil 20, thus completing the circuit through coil 20.

As the current induced in the secondary of transformer T is proportional to the armature current of the synchronous motor, the current flowing through coil 20 will be very high when the motor is first started and will decrease as the speed of the motor increases. Consequently the torque action on shaft 12 created by the magnetic flux generated in coil 20 will far exceed the torque created by coil 18 when the motor is first started.

As the speed of the rotor of the motor increases, the armature current is gradually reduced and the frequency of the pulsations of said current is likewise reduced until finally a speed is reached at which it is desirable to apply the direct current excitation to the synchronous motor. Coil 20 and the relay are so constructed that when the armature current is sufficiently reduced, the torque created by coil 20 will be correspondingly reduced and an equilbrium is established in the relay. However, as the frequency of armature current pulsations approaches the natural frequency of the relay a condition of unstable equilibrium is set up in the relay and as the "voltage coil" 18 will then exert a predominating torque on shaft 12, the latter will be shifted to allow contacts 5 and 8 to close.

Closing of contacts 5 and 8 of the relay completes a circuit from conductor 26 through wire 49, through wire 55 to a terminal of closing coil 56 of the direct current circuit switch 57, from the other terminal of coil 56 through wires 58 and 32 to conductor 29. Switch 57 is held in open position by a suitable conventional spring (not shown) until closed by the action of coil 56. It will be realized that as long as the "voltage coil" 18 of the relay creates the predominating torque on shaft 12, switch 57 will remain closed.

At this point it should be noted that switch 52 is controlled by switch 57 and is closed when switch 57 is open and vice versa. The purpose of switch 52 is to shunt the alternating current ammeter 59, which is connected by wire 60 with wire 51 and by wire 61 with wire 53, while the armature current is excessive during the starting period of the motor. After switch 52 is open current from wire 51 flows through wire 60, ammeter 59, wire 61, coil of overload relay 39, wire 54, coil 20, and wire 50 back to transformer T. A second transformer T' may be provided to actuate the overload relay 38 upon the flow of an unusual current through the armature of the motor. The secondary of this transformer is connected at one end to wire 51 and at the other end to wire 62 which, in turn, is connected to one end of the coil of overload relay 38.

Direct current supply lines 63 and 64 are connected to terminals of switch 57. Upon closing of switch 57 conductor 64 is connected directly by wire 65 to the rotor winding 23 of the synchronous motor and wire 63 is connected through wire 66, direct current ammeter 67 and wire 68 to winding 23.

Switch 57 also serves to actuate a switch 69 for placing a resistance 70 across conductors 65 and 68 to discharge the field. Switch 69 is closed when switch 57 is open and is open when switch 57 is closed to excite winding 23 with direct current.

With the above described system it will be appreciated that accurate control of the direct current excitation can be effected. Also upon the rotor pulling out, the system will be operated due to the increase in armature current to immediately cut out the direct current excitation. Of course, when the motor again reaches a speed approaching synchronous speed, the system will actuate to cut in the direct current excitation at the proper time.

From the foregoing description it will be realized that the present invention provides an excitation control relay which is sensitive to the pulsations in the armature current of the motor. Moreover, the present invention provides a relay synchronizer which utilizes an effect of the voltage applied to the motor in opposition to an effect produced by variations in the armature current. This avoids fluctuations in the operation of the relay due to mere changes in the voltage applied to the motor as the armature current will also vary in proportion to any variation in voltage.

The successful operation of this system is due primarily to the relay 1 which is highly sensitive and responsive to the variations in the electrical effects in the motor circuit. The arrangement of the armatures to be affected by opposed torques is also important. In Fig. 8 of the drawings, I have shown curves illustrating the torque effects. Curve 71 represents the torque produced by coil 18 on armature 15 tending to close the excitation control circuit, and curve 72 represents the torque produced by coil 20 on armature 16 tending to open the excitation circuit. The torques exerted on the armatures 15 and 16 with constant voltage impressed on coil 18 and with constant current flowing through coil 20 as ordinates are plotted against the angular position of the armatures relative to a line passing between the poles of the electromagnets, as abscissae, to produce curves 71 and 72.

It is apparent from the torque curves that there is a critical angular position at which the net torque on the shaft changes direction. By proper design of the voltage coil 18 and current coil 20 this change is made to occur at a current corresponding to the armature current of the synchronous motor at 95% speed. The relay is also designed so that it has a natural oscillating frequency equal to the frequency of the pulsation of the armature current of the synchronous motor at 95% speed. This results in a very definite change over point in the relay operation.

Summarizing, the operation according to the present invention takes place according to the following sequence:

1. When the main line switch 27 closes to apply power to the synchronous motor both windings of the relay are energized, but as shown by the curve of Fig. 7 the current is high so the current armature 16 is subjected to greatest torque and holds the relay contact 5, 8 open.

2. As the motor accelerates the armature current decreases and approaches the point where the torques on the two armatures are equal. At 95% speed the armature current pulsation equals the natural frequency of the relay and causes the relay to oscillate. Since the relay armatures 15 and 16 are in an unstable position the torque applied to the voltage armature overpowers and the relay operates to close its contact 5, 8. When the relay contact closes direct current field excitation is applied and synchronizes the motor.

3. As soon as the motor synchronizes the armature current drops to normal full load current. Under this condition the voltage coil 18 in the relay holds the relay contact closed which in turn holds the field switch 57 closed.

4. If some disturbance such as a momentary voltage dip, a momentary overload or momentary power failure, causes the motor to lose synchronism, the armature current rises to a value nearly equal to the standstill current and causes the relay to open its contact and remove the field excitation. The motor is then free to accelerate and re-synchronize as soon as conditions return to normal.

In some instances it may be found desirable not to utilize the fluctuations in the armature current because in the case of starting at reduced voltage and using the relay to effect shifting to full voltage at, for instance, 50% speed the frequency of pulsations would be too high for a practical design of the relay (i. e., the frequency would be 30 cycles per second using a 60 cycle current).

When it is desired to use reduced voltage starting with a shift to full voltage at an intermediate speed then the coils 18 and 20 of the relay should be so positioned and the angle between the armatures 15 and 16 should be so selected as to throw in the running switch to change the current supplied to the motor from reduced voltage to full voltage.

While I have shown and described the preferred embodiment of my invention, I wish it to be understood that I do not confine myself to the precise details herein set forth by way of illustration as it is apparent that many changes and variations may be made therein by those skilled in the art, without departing from the spirit of the invention or exceeding the scope of the appended claims.

I claim:

1. A circuit making and breaking relay comprising a shaft, a pair of armatures thereon angularly displaced from each other, a U-shaped magnetic core positioned to act on one of the armatures, a coil mounted on one of the legs of the core to set up a magnetic field therein, a second U-shaped magnetic core parallel to the first mentioned core positioned to act on the other armature, a second coil mounted on the opposite leg of the second mentioned core to set up a magnetic field therein and contact members whose relative position is controlled by the shaft.

2. A circuit making and breaking relay comprising a shaft, a pair of armatures mounted thereon displaced approximately 75° angularly from each other, a U-shaped magnetic core positioned to act on one of the armatures, a coil mounted on one of the legs of the core to set up a magnetic field therein, a second U-shaped magnetic core parallel to the first mentioned magnetic core positioned to act on the other armature, a second coil mounted on the opposite leg of the second mentioned core to set up a magnetic field therein and contact members whose relative position is controlled by the shaft.

3. A circuit making and breaking relay comprising a shaft, a pair of armatures mounted thereon angularly displaced approximately 75° from each other, a U-shaped magnetic core positioned to act on one of the armatures, a coil mounted on one of the legs of the core to set up a magnetic field, a second U-shaped magnetic core parallel to the first mentioned core positioned to act on the other armature, a second coil mounted on the opposite leg of the second mentioned core to set up a magnetic field therein, contact members whose relative position is controlled by the shaft, and spring means tending to hold the contact members together.

4. A circuit making and breaking relay comprising a shaft, a pair of armatures mounted thereon angularly displaced from each other, a U-shaped magnetic core positioned to act on one of the armatures, a coil mounted on one of the legs of the core to set up a magnetic field therein, a second U-shaped magnetic core parallel to the first mentioned core positioned to act on the other armature, a second coil mounted on the opposite leg of the second mentioned core to set up a magnetic field therein, contact members whose relative position is controlled by the shaft, and an arm on the shaft adapted to move at least one of the contact members, said shaft assembly having a natural period of vibration.

5. A circuit making and breaking relay comprising a shaft, a pair of armatures mounted thereon angularly displaced from each other, each of said armatures being adjustably mounted on said shaft, a U-shaped magnetic core positioned to act on one of the armatures, a coil mounted on one of the legs of the core to set up a magnetic field therein, a second U-shaped magnetic core parallel to the first mentioned core positioned to act on the other armature, a second coil mounted on the opposite leg of the second mentioned core to set up a magnetic field therein, contact members whose relative position is controlled by the shaft, and an arm on the shaft adapted to move at least one of the contact members.

6. A circuit making and breaking relay comprising a shaft, a pair of armatures mounted thereon angularly displaced from each other, each of said armatures being adjustably mounted on said shaft, a U-shaped magnetic core positioned to act on one of the armatures, a coil mounted on one of the legs of the core to set up a magnetic field therein, a second U-shaped magnetic core parallel to the first mentioned core positioned to act on the other armature, a second coil mounted on the opposite leg of the second mentioned core to set up a magnetic field therein, contact members whose relative position is controlled by the shaft, an arm on the shaft, and a lug on one of the contact members which is adapted to be moved by the arm.

7. A circuit making and breaking relay comprising a shaft, a pair of armatures mounted thereon angularly displaced approximately 75° from each other, each of said armatures being adjustably mounted on said shaft, an inverted U-shaped magnetic core positioned to act on one of the armatures, a coil mounted on one of the legs of the core to set up a magnetic field therein, a second inverted U-shaped magnetic core parallel to the first mentioned core positioned to act on the other armature, a second coil mounted on the opposite leg of the second mentioned core to set up a magnetic field therein, contact members whose relative position is controlled by the shaft, an arm on the shaft, a lug on one of the contact members which is adapted to be moved by the arm, and spring means tending to hold the contact members together.

FRANK H. MILLIKEN.